United States Patent
Fukunaga et al.

(10) Patent No.: US 9,148,997 B2
(45) Date of Patent: Oct. 6, 2015

(54) WORK APPARATUS

(71) Applicant: MAKITA CORPORATION, Aichi (JP)

(72) Inventors: Ko Fukunaga, Aichi (JP); Masaki Sakuragi, Aichi (JP); Atsushi Yamamoto, Aichi (JP); Minoru Yamamoto, Aichi (JP)

(73) Assignee: MAKITA CORPORATION, Aichi (JP)

( * ) Notice: Subject to any disclaimer, the term of this patent is extended or adjusted under 35 U.S.C. 154(b) by 191 days.

(21) Appl. No.: 13/859,911

(22) Filed: Apr. 10, 2013

(65) Prior Publication Data

US 2013/0276314 A1    Oct. 24, 2013

(30) Foreign Application Priority Data

Apr. 18, 2012  (JP) .................................. 2012-094925

(51) Int. Cl.
*A01D 34/90* (2006.01)
*A01D 34/412* (2006.01)
*A01D 34/416* (2006.01)

(52) U.S. Cl.
CPC ............ *A01D 34/905* (2013.01); *A01D 34/412* (2013.01); *A01D 34/4165* (2013.01)

(58) Field of Classification Search
CPC  A01D 34/412; A01D 34/4165; A01D 34/905
USPC ........................................................ 30/276
See application file for complete search history.

(56) References Cited

U.S. PATENT DOCUMENTS

| | | | | |
|---|---|---|---|---|
| 4,035,912 | A | * | 7/1977 | Ballas et al. ..................... 30/276 |
| 4,126,928 | A | * | 11/1978 | Hoff ................................ 29/445 |
| 4,491,184 | A | * | 1/1985 | Kawaharazuka .......... 173/162.1 |
| 4,759,128 | A | * | 7/1988 | Katoh et al. ..................... 30/276 |
| 4,987,732 | A | * | 1/1991 | Terai et al. ....................... 56/255 |
| 6,213,677 | B1 | * | 4/2001 | Yamane et al. ................ 403/329 |
| 6,550,145 | B2 | * | 4/2003 | Stoll et al. ........................ 30/276 |
| 6,739,058 | B2 | * | 5/2004 | Warashina et al. ............. 30/276 |
| 6,925,718 | B2 | * | 8/2005 | Bartmann et al. .............. 30/276 |
| 6,997,812 | B2 | * | 2/2006 | Sasaki et al. ................... 464/162 |
| 8,146,257 | B2 | * | 4/2012 | Nishiura et al. ................. 30/276 |
| 8,186,937 | B2 | * | 5/2012 | Brewster et al. ................ 415/90 |
| 8,549,945 | B2 | * | 10/2013 | Rho et al. .................. 74/388 PS |
| 8,803,374 | B2 | * | 8/2014 | Yoshida et al. ................. 310/43 |

(Continued)

FOREIGN PATENT DOCUMENTS

JP    2010-148484    7/2010
JP    2012-95572    *    5/2012

*Primary Examiner* — Hwei C Payer

(74) *Attorney, Agent, or Firm* — Greenblum & Bernstein, P.L.C.

(57) ABSTRACT

A work apparatus includes a drive motor, a tool head including a tool frame, a bearing, a tool shaft and a rotary tool, a frame tube with the proximal end connected to the drive motor and the distal end connected to the tool head, and a drive shaft rotatably inserted through the frame tube for transmitting the rotation of the drive motor to the rotary tool. The rotary tool is accommodated within the tool frame and is rotatable on the tool shaft, when driven by the drive shaft. The tool shaft is journaled by the bearing which is elastically supported by a flexible elastic member disposed coaxially around the bearing and interposed between the bearing and the connection of the tool frame or the frame tube. Undesirable vibrations caused by the rotation of the rotary tool will be effectively hindered from being transmitted to the frame tube.

13 Claims, 11 Drawing Sheets

(56) References Cited

U.S. PATENT DOCUMENTS

| | | | |
|---|---|---|---|
| 8,857,067 B2* | 10/2014 | Moreno | 30/388 |
| 8,939,345 B2* | 1/2015 | Isobe et al. | 227/179.1 |
| 2005/0028382 A1* | 2/2005 | Nakadate et al. | 30/276 |
| 2012/0246943 A1* | 10/2012 | Yuasa | 30/276 |
| 2013/0276314 A1* | 10/2013 | Fukunaga et al. | 30/276 |
| 2014/0352468 A1* | 12/2014 | Kim | 74/409 |

* cited by examiner

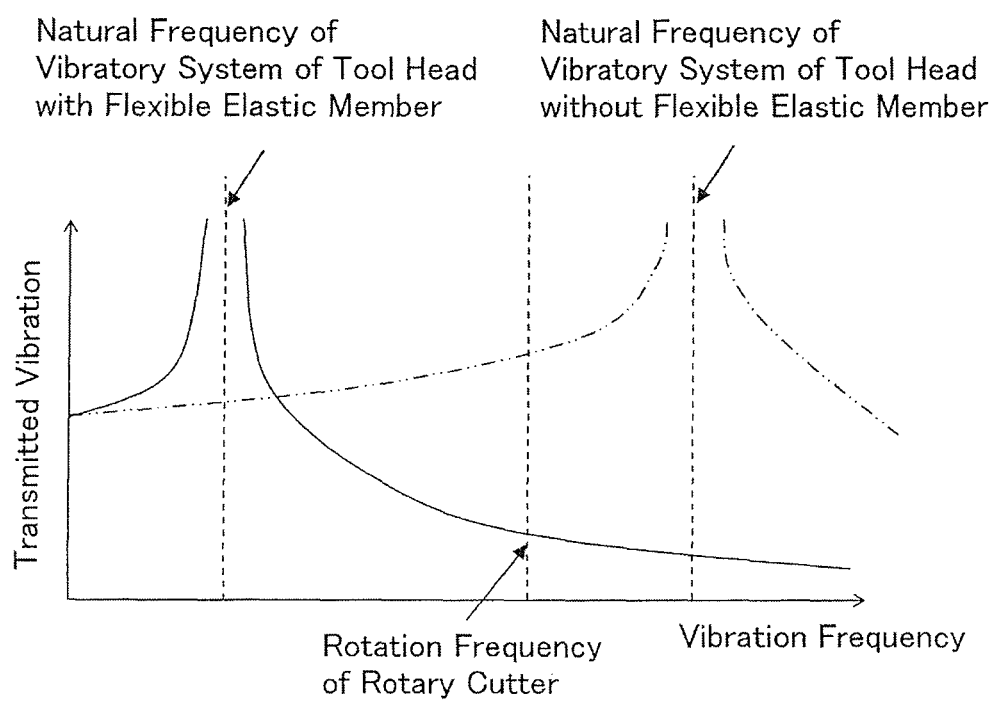
Fig. 3 Vibrations of Vibratory System of Tool Head

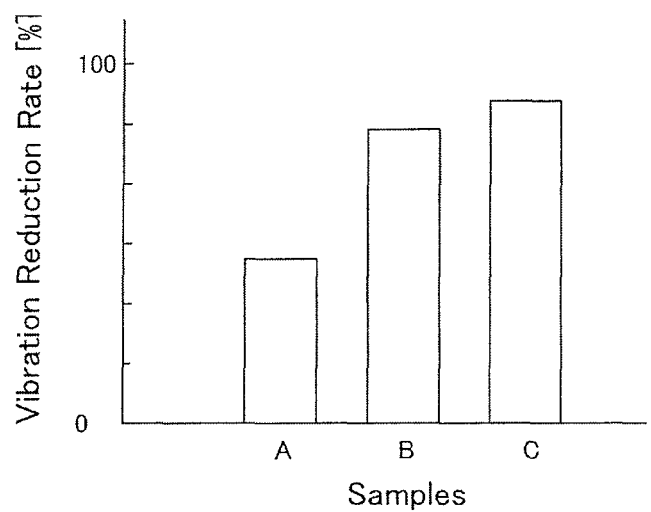
Fig. 4a  Vibration Reductions at Grip Handle
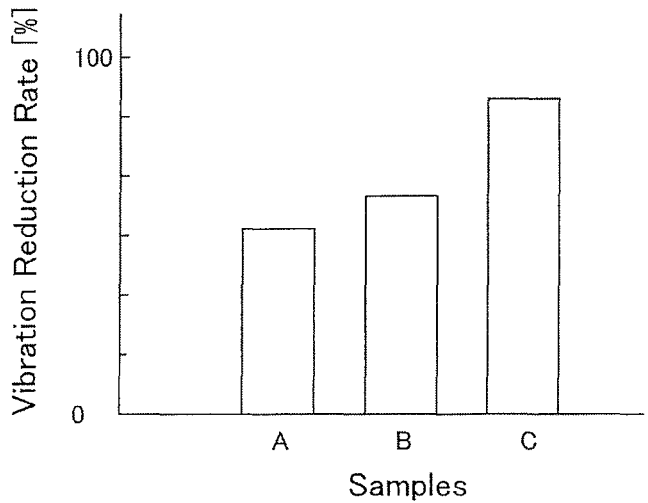
Fig. 4b  Vibration Reductions at Ring Handle

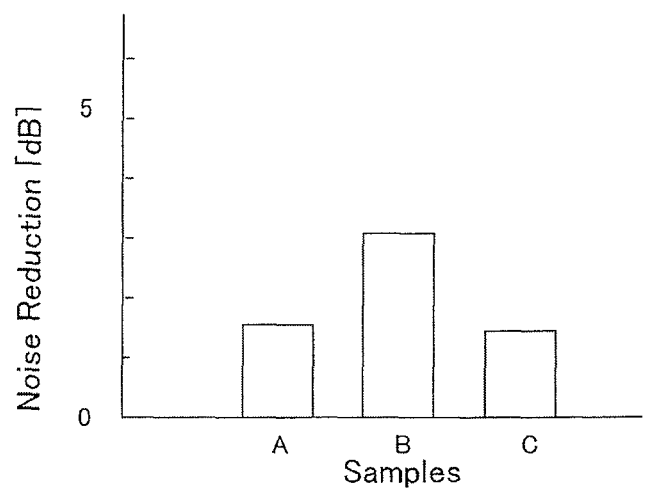
Fig. 4c  Noise Reductions at Operator's Ear

WORK APPARATUS

TECHNICAL FIELD

The present invention relates to a work apparatus such as a vegetation cutter, a brush cutter, a lawn trimmer, a grinder, a sander and a polisher, and more particularly to a work apparatus which comprises a drive motor, a tool head including a rotary tool, a frame tube having a proximal end connected to the drive motor and a distal end connected to the tool head, and a drive shaft rotatably inserted through the frame tube for connecting the drive motor to the rotary tool, in which undesirable vibrations caused by the rotation of the rotary tool will be effectively hindered from being transmitted to the frame tube so as to relieve the operator of the apparatus from fatigue.

BACKGROUND INFORMATION

An example of a lawn trimmer is disclosed in U.S. Pat. No. 4,126,928, which comprises a drive motor which is a gasoline engine, a tool head which is a rotating cutter tool including a rotary cutter having a tool shaft or mandrel, a frame tube in the shape of a hollow operating pole having a straight portion toward a proximal end which is connected to the drive motor and a bent portion toward a distal end which is connected to the tool head, and a flexible drive shaft rotatably inserted through the frame tube and connecting the drive motor to the tool shaft of the rotary cutter. The tool shaft of the rotary cutter is rotatably supported by means of a ball bearing within the tool head.

With the lawn trimmer mentioned above, the vibration caused by the rotation of the rotary cutter when trimming the lawn or cutting the grass will be transmitted to the hands of the operator who is holding the frame tube, which vibration of the frame tube would more or less fatigue the operator. Particularly in the case of a rotary cutter having a cutting line made of, for example, a nylon filament or the like as the cutting tool, the cutting line is likely to be frayed or broken due to abrasion resulting in the imbalance of the rotary cutter with respect to its tool shaft, consequently increasing the vibration of the frame tube. Such has been a drawback with the conventional lawn trimmer.

In order to remove the above-mentioned drawback from the conventional lawn trimmer, the lawn trimmer of the above U.S. patent employs an inner tube supported by several bushings coaxially interposed inside the frame tube, the drive shaft being inserted through the inner tube, so that the vibration of the drive shaft should be suppressed via the bushings. The above-mentioned vibration suppressing structure, however, has limitations in suppressing the vibrations of the frame tube where the vibration of the rotary cutter, i.e. the source of vibration is considerably strong.

A vegetation cutter disclosed in unexamined Japanese patent publication No. 2010-148484 comprises a frame tube having a proximal end and a distal end, an internal combustion engine connected to the proximal end of the frame tube, a cutting tool connected to the distal end of the frame tube, and a drive shaft inserted through the frame tube and driven by the engine. To the distal end of the frame tube is provided a gear case, in which a smaller gear formed at a tip end of the drive shaft is in meshing engagement with a larger gear formed at a proximal end of a rotary tool shaft of a cutting blade so that the rotation of the drive shaft is transmitted to the tool shaft to rotate the cutting blade of the cutting tool.

The disclosed vegetation cutter comprises an elastic member interposed between the drive shaft and the smaller gear and another elastic member interposed between the larger gear and the tool shaft, which configuration performs advantageous functions of suppressing vibrations produced by the torsional deformation of the drive shaft, suppressing torque variations to be transmitted to the drive shaft when impacts are given to the cutting blade, and suppressing gear noises produced by the meshing gears.

With a lawn trimmer and a vegetation cutter as mentioned above, however, some part of the cutting blade may be broken while cutting grasses or branches and the cutting blade may get imbalanced with respect to the tool shaft, which may enlarge the vibrations of the frame tube while the cutting blade is rotating. This type of vibrations due to the imbalance of the cutting blade will not be suppressed by the elastic members interposed between the drive shaft and the smaller gear and between the larger gear and the rotary shaft, and consequently the vibrations will fatigue the operator of the apparatus.

SUMMARY OF THE INVENTION

In view of the foregoing circumstances, therefore, it is a primary object of the present invention to obviate the above-mentioned drawback residing in the conventional lawn trimmer, a vegetation cutter and the like, and to provide a work apparatus, in which the vibrations of the rotary tool constituting a vibration source will be effectively hindered from being transmitted to the frame tube, thereby relieving the operator of the work apparatus from fatigue.

According to the present invention, the object is accomplished by providing a work apparatus comprising: a drive motor; a tool head including a tool frame, a bearing, a tool shaft and a rotary tool, the rotary tool being accommodated within the tool frame and being rotatable on the tool shaft supported by the bearing; a frame tube having a proximal end connected to the drive motor and a distal end connected to the tool frame of the tool head; a drive shaft rotatably inserted through the frame tube and connecting the drive motor to the tool shaft to rotatably drive the rotary tool; and a flexible elastic member coaxially disposed around the bearing for elastically supporting the bearing on the connection of the tool frame and the frame tube. The vibrations caused by the rotary tool will be hindered from being transmitted to the frame tube by means of the interposed flexible elastic member.

With the work apparatus configured as above, the natural frequency of the vibratory system or structural system constituted by the rotary tool, the flexible elastic member and the tool frame plus the frame tube is lowered than the rotation frequency of the rotary tool, and consequently the vibrations generated by the rotation of the rotary tool will be effectively hindered from being transmitted to the frame tube, which in turn will alleviate the fatigue on the side of the operator holding the frame tube.

Generally speaking, in the case of a work apparatus wherein the frame tube has a straight portion toward the proximal end connected to the drive motor and a bent portion toward the distal end connected to the tool frame of the tool head, the vibrations generated by the rotary tool would be easily transmitted to the straight portion at which the holding handles for the operator are disposed. However, with the present invention, the vibrations of the operator handles will be considerably reduced by means of the flexible elastic member disposed around the bearing to elastically support the bearing against the tool frame and frame tube. Thus, the work apparatus according to the invention will exhibit an advantageous effect particularly in the case of a work apparatus employing a frame tube having a straight portion and a bent portion.

Further in the case of a work apparatus wherein the rotary tool is a rotary cutter employing a cutting line or a cutting disk blade rotatable on a tool shaft or mandrel driven by the drive shaft through the frame tube, the cutting line or the cutting disk blade is likely to be frayed or broken due to abrasion, resulting in the imbalance of the rotary cutter with respect to the tool shaft, and consequently the rotary cutter would vibrate strongly. However, with the present invention, the vibrations of the rotary cutter will be hindered from being transmitted to the frame tube, and consequently the vibrations to be exerted to the operator holding the handles of the frame tube will be reduced.

In an aspect of the present invention, the flexible elastic member may be a tubular member made of rubber enclosing the bearing which journals the tool shaft of the rotary tool. In addition, the assembling procedure will be facilitated with this configuration.

BRIEF DESCRIPTION OF THE DRAWINGS

For a better understanding of the present invention, and to show how the same may be practiced and will work, reference will now be made, by way of example, to the accompanying drawings, in which:

FIG. 3 is a graphical presentation of the transmitted vibration versus vibration frequency characteristic of the vibratory system;

FIG. 4a is a graphical presentation of the vibration reductions at the grip handle of the apparatus;

FIG. 4b is a graphical presentation of the vibration reductions at the ring handle of the apparatus;

FIG. 4c is a graphical presentation of the noise reductions at the operator's ear;

DETAILED DESCRIPTION OF EMBODIMENTS OF THE INVENTION

Figure 1:
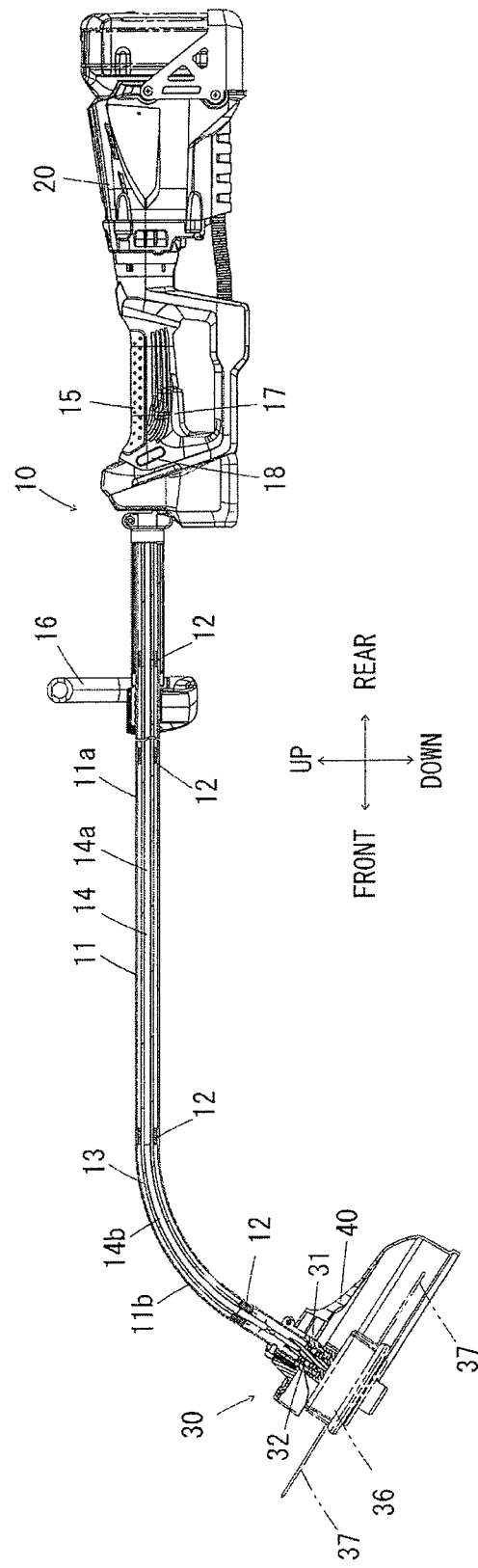
FIG. 1 is a longitudinal cross-sectional view of a first embodiment of a work apparatus according to the present invention.

The invention and its various embodiments can now be better understood by turning to the following detailed description of the preferred embodiments with reference to the accompanying drawings.

It should be expressly understood that the illustrated embodiments are presented just as practicable examples of the invention and that the invention as defined by the claims may be broader than the illustrated embodiments described below. In the drawing, like reference characters refer to like parts so that repetitive explanations may be omitted.

Figure 2:
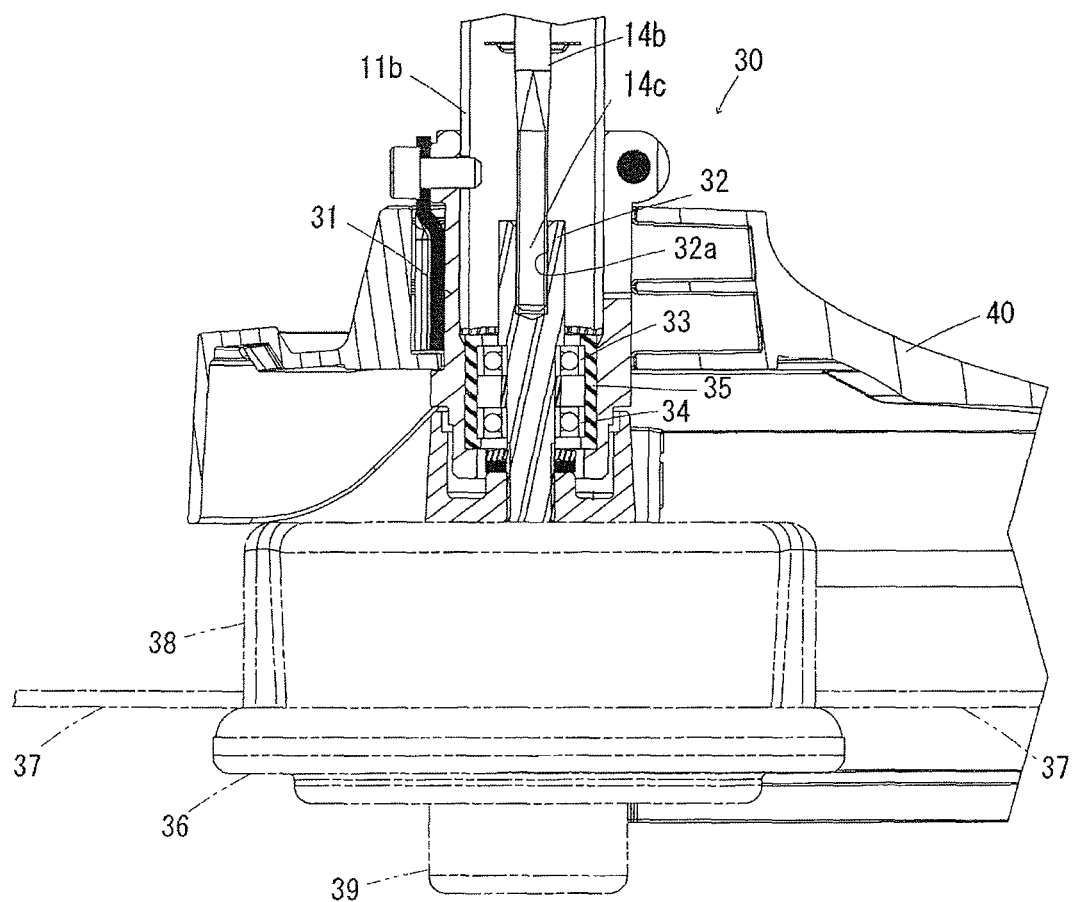
FIG. 2 is an enlarged cross-sectional view of a tool head in the work apparatus of FIG. 1.

The structure of a vegetation cutter as a first embodiment of a work apparatus according to the present invention is shown in FIGS. 1 and 2, in which FIG. 1 shows a longitudinal cross-sectional view thereof and FIG. 2 an enlarged cross-sectional view of a tool head in the vegetation cutter of FIG. 1. The vegetation cutter 10 comprises a drive motor (electric motor) 20, a tool head 30 including a rotary tool (rotary cutter) 36, a frame tube 11 in the shape of a hollow pole having a proximal end connected to the drive motor 20 and a distal end connected to the tool head 30, and a drive shaft 14 rotatably inserted through the frame tube 11 and connecting the drive motor 20 to the rotary tool 36. The tool head 30 has a tool frame 31 as the structural frame thereof for rotatably holding the rotary tool 36 which is rotatable on its shaft (tool shaft) or mandrel 32 driven by the drive shaft 14 energized by the drive motor 20. The vegetation cutter 10 further comprises, as a characteristic feature of the present invention, a flexible elastic member 35 coaxially disposed around the bearings 33, 34 (FIG. 2) of the tool shaft 32 to support the bearings 33, 34 on the tool frame 31. The flexible elastic member 35 serves to effectively impede the vibration of the rotary tool 36 from being transmitted to the tool frame 31.

The structure of the vegetation cutter 10 will be described in more detail hereunder. The frame tube 11 is made of an elongate aluminum tube having a proximal end and a distal end, and is bent near the distal end. The frame tube 11 has a straight portion 11a toward the proximal end which is connected to the drive motor 20 and a downwardly bent portion 11b toward the distal end which is connected to the tool head 30. Within the frame tube 11 is coaxially disposed therewith an inner tube 13 made of plastic (synthetic resin), which is supported by five bushings 12 made of an elastic material interposed between the inner tube 13 and the frame tube 11 and located longitudinally apart from each other.

Within the inner tube 13 is inserted the drive shaft 14 extending from the drive motor 20 to the tool head 30. The drive shaft 14 consists of a straight portion 14a lying in the straight portion 11a of the frame tube 11 and a flexible portion 14b connected to the straight portion 14a and lying in the bent portion 11b of the frame tube 11. The flexible portion 14b is made of a metal wire helically wound in a coil shape. The proximal end of the straight portion 14a of the drive shaft 14 is connected to the drive motor 20, while the distal end 14c of the flexible portion 14b of the drive shaft 14 is connected to the tool shaft 32 of the rotary cutter 36 as the rotary tool. The drive shaft 14 may be made flexible over the entire length thereof.

The frame tube 11 is provided with a grip handle 15 around its circumference near the proximal end for the operator to hold by one hand (for example, the right hand) and with a ring handle 16 attached thereto at a middle position along the length of the frame tube 11 for the operator to hold by the other hand (for example, the left hand). The grip handle 15 includes a power switch 17 electrically connected to the drive motor 20 and a safety lock release button 18 for the power switch 17. The operator first presses the safety lock release button 18 and then, with the safety lock release button kept pressed, presses the power switch 17 to energize the drive motor 20.

In the illustrated embodiment, the drive motor 20 is an electric motor to rotate the drive shaft 14. As the drive motor 20 is energized, the drive shaft 14 rotates on its longitudinal axis and in turn the rotary cutter 36 in the tool head 30 connected to the drive shaft 14 rotates on the tool shaft 32. Further in this embodiment, although not shown in detail, the bearing which supports the rotation output shaft of the drive motor is in turn supported on the structural frame of the drive motor 20 via a flexible elastic member such as O-rings surrounding the bearing, in order to suppress the vibrations of the rotating drive motor 20. The vibrations of the drive motor 20 itself and the vibrations to be transmitted to the frame tube 11 may be reduced by mounting the drive motor 20 in a housing via a flexible elastic member or by pressing a flexible elastic member against a part of the drive motor 20. It should be understood also that the drive motor 20 may be an internal combustion engine in place of the electric motor for driving the drive shaft 14.

The tool head 30 is for cutting grasses or lawns with the rotating rotary cutter 36, and comprises, as shown in FIG. 2, a tool frame 31 having a cylindrical portion to be detachably fixed to the distal end portion of the frame tube 11, the rotary cutter 36 having the tool shaft 32 and rotatable on the tool shaft 32, and a pair of upper and lower ball bearings 33, 34 to rotatably support the tool shaft 32.

Into the cylindrical portion of the tool frame 31 is inserted from above the distal end portion of the frame tube 11 and is detachably fixed to the tool frame 31 by means of a bolt. Within the tool frame 31 is provided the tool shaft or mandrel 32 coaxially with the axis of rotation of the rotary cutter 36 and is rotatably supported by the pair of upper and lower ball bearings 33, 34 disposed in the lower part of the cylindrical portion of the tool frame 31. The tool shaft 32 is formed with a squared hole 32a at its upper (proximal) end, and the flexible portion 14b of the drive shaft 14 is formed with a squared rod portion 14c at its lower (distal) end, which squared rod portion 14c is engaged with the squared hole 32a so that the rotation of the drive shaft 14 is transmitted to the tool shaft 32.

The flexible elastic member 35 is formed in a cylindrical shape and is interposed between the outer circumference of the outer race rings of the pair of upper and lower ball bearings 33, 34 which support the tool shaft 32 and the inner circumferential wall of the cylindrical portion of the tool frame 31, thereby surrounding the ball bearings 33, 34. The flexible elastic member is made of rubber having a predetermined elastic modulus and determines the natural frequency (i.e. characteristic frequency) of the vibratory system consisting of the tool frame 31 and frame tube 11 connection, the rotary cutter 36 assembly including the tool shaft 32 and the bearings 33, 34, and the flexible elastic member 35 coupling the connection and the assembly to be lower than the rotational frequency (7000 rpm in this embodiment) of the rotary cutter 36. Thus, the vibrations caused by the rotary cutter 36 is impeded from being propagated throughout the vibratory system, in other words from being transmitted to the frame tube 11. More specifically, the present embodiment employs heat resistant and abrasion resistant material such as fluorine rubber (e.g. polytetrafluoroethylene) for the flexible elastic member.

The rotary cutter 36 in the present embodiment is configured with a cutting line 37 made of two nylon (polyamide) filaments or strings as the cutting elements, which are formed by nylon filaments wound on a spool (not shown) within a cylindrical spool case 38 and a predetermined length of the two nylon filaments 37 respectively emerge through two apertures formed equally apart from each other along the circumferential wall of the case 38.

The rotary cutter 36 comprises a bumper protrusion 39 integrally formed with the spool (not shown) which is normally locked to the case 38 and rotates together with the case 38. When the bumper protrusion 39 which is normally urged downward by a spring is pushed upward into the case 38, the locked engagement between the spool (not shown) and the case 38 will be released allowing the spool to rotate by a certain amount of angle relatively to the case 38. By striking the downwardly protruding bumper 39 against the ground to push up the bumper protrusion 39 while the rotary cutter 36 is rotating on the tool shaft 32 driven by the drive shaft 14, the spool is released from the case 38 and rotates by a certain amount of angle relative to the case 38 so that the nylon filaments 37 wound around the spool are reeled out from the case 38.

A guard 40 is disposed around the tool frame 31 covering the rotary cutter 36 to protect the operator therefrom. The guard 40 is arranged to cover the part of the circumference of the rotary cutter 36 which part faces toward the operator holding the vegetation cutter 10. Inside the guard 40 is disposed a metallic cutter (not shown) for cutting the nylon filaments 37 to a predetermined length. The metallic cutter (not shown) is to cut the nylon filaments 37 extending out from the case 38 while the rotary cutter 36 is rotating so that the extension of the nylon filaments shall not exceed a predetermined necessary length. It should be understood that the rotary cutter 36 should not be limited to the one with a cutting line as the cutting element but may be the one with a cutting blade made of a metallic disk having knife edges on its circumference.

Hereinafter will be described how the vegetation cutter 10 of the above-mentioned configuration works. The operator holds the grip handle 15 with his/her right hand and the ring handle 16 with his/her left hand to keep the rotary cutter 36 above the ground by a small distance. The operator then pushes the safety lock release button 18 and, keeping pushing it, pushes the power switch 17. The electric motor 20 rotates the drive shaft 14 which in turn rotates the tool shaft 32 of the rotary cutter 36. As the operator swings the frame tube 11 to right and left to move the rotating rotary cutter 36 to right and left, the grasses or the lawns standing on the ground are cut off by the two nylon filaments 37 of the rotating rotary cutter 36.

The two nylon filaments 37 of the rotary cutter 36 are lead out by a same predetermined amount of length from two holes formed on the circumferential side wall of the case 38 at positions equally apart from each other along the circumference. Before the vegetation cutter 10 is used for cutting grasses, neither of the two nylon filaments 37 has been frayed by abrasion to be shorter than the other, and the center of gravity of the rotary cutter 36 exists substantially on the tool shaft 32. Thus, the rotation of the rotary cutter 36 will not cause any substantial vibration.

On the other hand, as the vegetation cutter 10 is used to cut grasses with the nylon filaments 37, one of the two nylon filaments may be frayed more than the other of the two or may be broken to be shorter than the other. When the bumper protrusion 39 of the rotary cutter 36 is struck against the ground to reel out the nylon filaments 37 from the spool in the case 38, the center of gravity of the spool on which are wound the nylon filaments 37 within the case 38 may be a little bit shifted aside from the axis of the tool shaft 32. Thus, the rotary cutter 36 made of nylon filaments 37 may have its center of gravity shifted aside from the axis of the tool shaft 32 through the use for cutting grasses. The imbalanced rotation of the rotary cutter 36 is apt to cause vibrations of the vegetation cutter 10.

FIG. 3 is a graphical presentation of the transmitted vibration versus vibration frequency characteristic of the vibratory system of the tool head 30, illustrating the vibrations (amplitudes), in a relative scale, of the tool frame 31 of the tool head 30 observed when vibrations of various frequencies are applied to the rotary tool 36 (the vibration source) in the vibratory system. As shown in FIG. 3, in the case of the vibratory system consisting of the tool frame 31 plus frame tube 11 connection and the rotary cutter 36 assembly (i.e. not including a flexible elastic member), the natural frequency of the vibratory system of the tool head 30 without the flexible elastic member 35 is higher than the rotation frequency of the rotary cutter 36 (7,000 rpm in this embodiment), and accordingly the vibrations originated at the rotary cutter and transmitted to the tool head-frame tube connection cannot be suppressed at the rotation frequency of the rotary cutter 36.

Contrary to such a vibratory system, in the vegetation cutter 10 according to the present invention, the flexible elastic member 35 is coaxially disposed around the bearings 33, 34 supporting the tool shaft 32, and accordingly the natural frequency of the vibratory system consisting of the tool frame 31 plus frame tube 11 connection, the rotary cutter 36 assembly including the tool shaft 32 and the bearings 33, 34, and the flexible elastic member 35 coupling the connection and the assembly is made lower than the rotation frequency of the rotary cutter 37, and the vibrations originated at the rotary cutter and transmitted to the tool head-frame tube connection can be effectively suppressed at the rotation frequency of the rotary cutter 36.

FIGS. 4a, 4b and 4c show the vibration reductions at the grip handle 15, the vibration reductions at the ring handle 16, and the noise reductions at the operator's ear, respectively, in the vegetation cutter employing the flexible elastic member 35 according to the present invention. The vibrations at the grip handle 15 and the vibrations at the ring handle 16 are measured in terms of the triaxial accelerations according to the IEC 60335-2-91 protocol. In FIGS. 4a, 4b and 4c, the samples A and B are of the rotary cutters 36 after being used for certain periods of time, respectively, and the sample C is of the rotary cutter 36 with one of the two nylon filaments 37 cut off to make imbalanced.

As shown in FIGS. 4a, 4b and 4c, with the flexible elastic member 35 interposed between the bearings 33, 34 of the tool shaft 32, the vibrations to be transmitted to the operator from the grip handle 15 and the ring handle 16 disposed on the frame tube 11 as well as the noises transmitted to the operator's ear will be effectively reduced. In this way, the flexible elastic member 35 coaxially interposed around the ball bearings 33, 34 which supports the tool shaft 32 of the rotary cutter 36 in fact suppresses the vibrations to be transmitted to the tool frame 31 of the rotary cutter 36 while the rotary cutter 36 is rotating around its shaft 32, which in turn suppresses the vibrations of the frame tube 11 to whose distal end the tool head 30 is fixed.

The vegetation cutter 10 of this embodiment also employs a vibration absorbing configuration in the drive motor 20 as described before. By properly selecting the material for the flexible elastic member of the vibration absorbing configuration in the drive motor 20, the natural vibration frequency of the skeletal structural system including the frame tube 11 and the tool frame 31 of the tool head 30 fixed to the distal end of the frame tube 11 can be controlled accordingly. By intentionally setting the vibration absorbing structure of the drive motor 20 in association with the structure of the tool head 30 so as to most effectively reduce the vibration transmission from the rotary cutter to the tool frame 31 of the tool head 30 by means of the flexible elastic member 35, the vibrations originated by the rotary cutter 36 and transmitted to the frame tube 11 where the flexible elastic member 35 is employed will be further effectively suppressed. The natural vibration frequency of the skeletal structure can be also controlled by properly selecting the material of the bushings 12 interposed in the frame tube 11.

Whereas, in the above described embodiment, the flexible elastic member 35 is in the shape of a cylinder interposed between the outer race rings of the ball bearings 33, 34 and the inner cylindrical wall of the tool frame 31 and surrounding the ball bearings 33, 34, various modifications of the shape may also be employed as depicted in FIGS. 5, 6 and 7a-7c.

Figure 5:
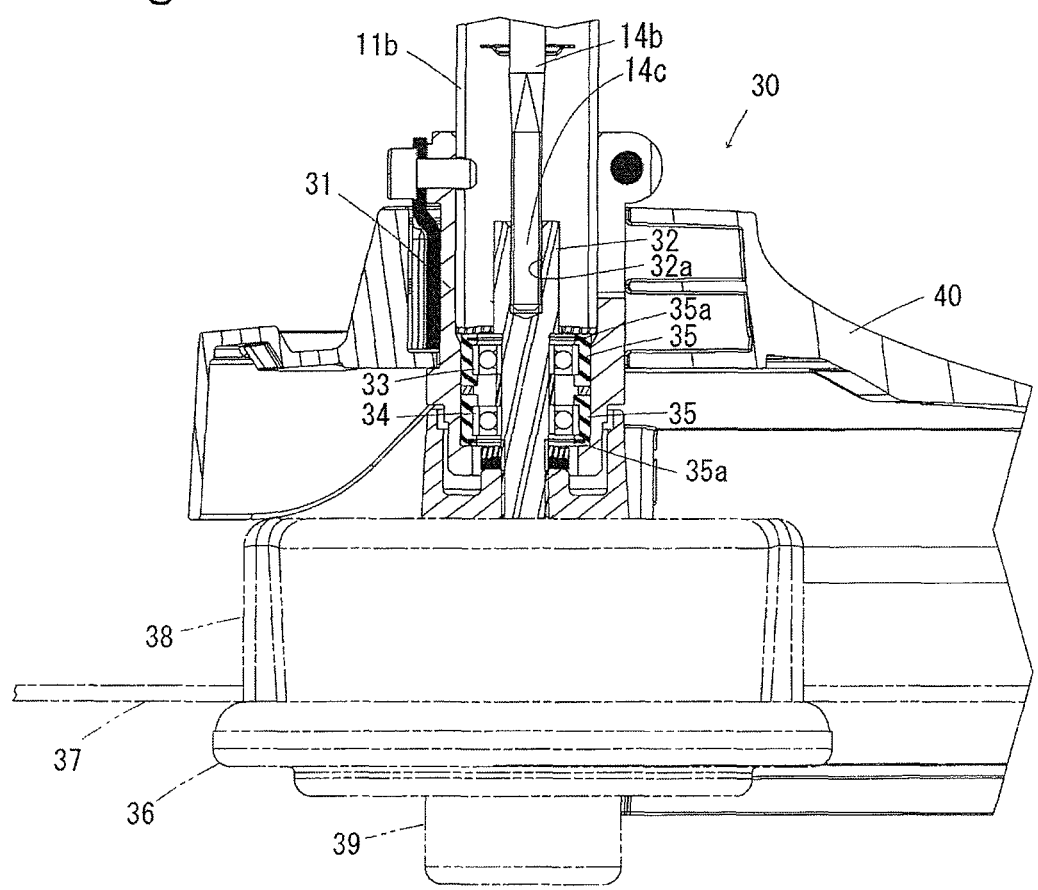
FIG. 5 is a cross-sectional view of a tool head employing a modified embodiment of the flexible elastic member.

In a modified embodiment of FIG. 5, a pair of axially short upper and lower cylindrical flexible elastic members 35, 35 may be provided at the positions corresponding to the pair of upper and lower ball bearings 33 and 34, respectively, with washer pieces 35a, 35a near the upper and the lower end of the inner circumference of the flexible elastic members 35, 35, respectively, to prevent excessive deformations of the members 35, 35. With this embodiment, when the rotary cutter 36 hits some hard obstacles, the flexible elastic members 35, 35 will be protected from excessive deformation.

Figure 6:
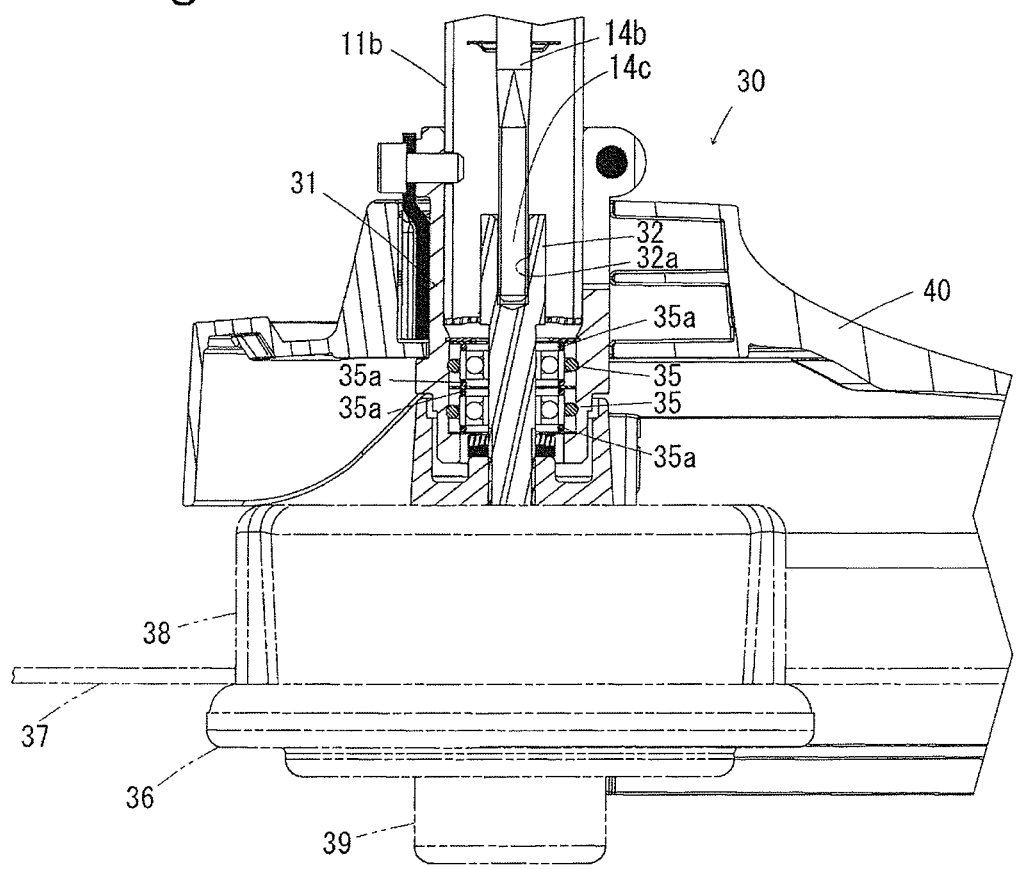
FIG. 6 is a cross-sectional view of a tool head employing a further modified embodiment of the flexible elastic member.

In a further modified embodiment of FIG. 6, a pair of upper and lower flexible elastic members 35, 35 in the shape of an O-ring are provided between the outer circumferences of the respective upper and lower ball bearings 33, 34 and the inner cylindrical wall of the tool frame 31, with O-rings 35a disposed on and under each of the bearings 33, 34.

Figure 7A:
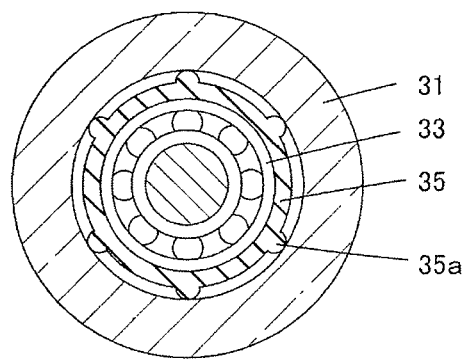
FIG. 7a is an enlarged cross-sectional view around the bearing in a tool head showing a further modification of the flexible elastic member.

In a further embodiment shown in FIG. 7a, the flexible elastic member 35 is in the shape of a cylindrical pipe surrounding the ball bearings 33, 34 with six ribs 35a of a semicircle cross section integrally protruded outward, extending in the axial direction and circumferentially spaced apart from each other by a same interval, thereby realizing a proper elastic modulus for suppressing the vibrations.

Figure 7B:
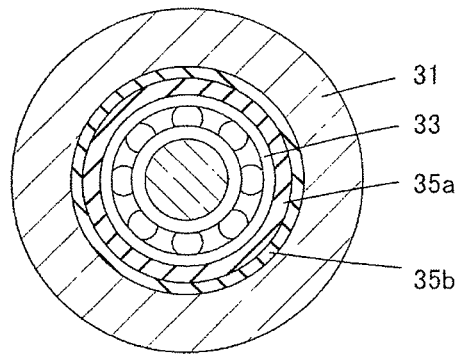
FIG. 7b is an enlarged cross-sectional view around the bearing in a tool head showing a still further modification of the flexible elastic member.

In a still further embodiment shown in FIG. 7b, the cylindrical flexible elastic member 35 is in a two-layer structure comprised of an inner flexible elastic member 35a and the outer flexible elastic member 35b each made of different material having different elasticity (or rigidity) from the other, thereby realizing a proper composite elastic modulus for suppressing the vibrations. The lamination may be of a three-layer structure or more to obtain a desired compound elastic modulus.

Figure 7C:
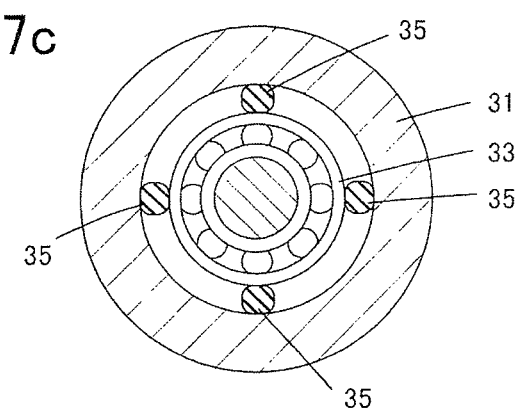
FIG. 7c is an enlarged cross-sectional view around the bearing in a tool head showing a still further modification of the flexible elastic member.

In a still further embodiment shown in FIG. 7c, the flexible elastic member 35 is constituted by four separate round rods made of rubber, which are interposed between the outer circumferences of the upper and the lower ball bearings 33 and 34 and the inner circumferential wall of the tool frame 31 positioned equally spaced apart from each other along the circumference of the ball bearings 33, 34. The number of rubber rods 35 may be five or more and may be positioned equally spaced apart from each other along the circumference of the ball bearings 33, 34.

In the illustrated embodiment, the tool shaft 32 is a shaft or mandrel on which the rotary tool 36 rotates and is driven by the drive shaft 14. Alternatively, the distal end of the drive shaft 14 itself may be extended into the rotary tool to constitute a part to serve as the tool shaft 32. In such a case, the part of the drive shaft 14 serving as the tool shaft 32 shall be rotatably supported by the bearings 33, 34 and the flexible elastic member 35 so as to enjoy the advantage of the invention.

Figure 8:
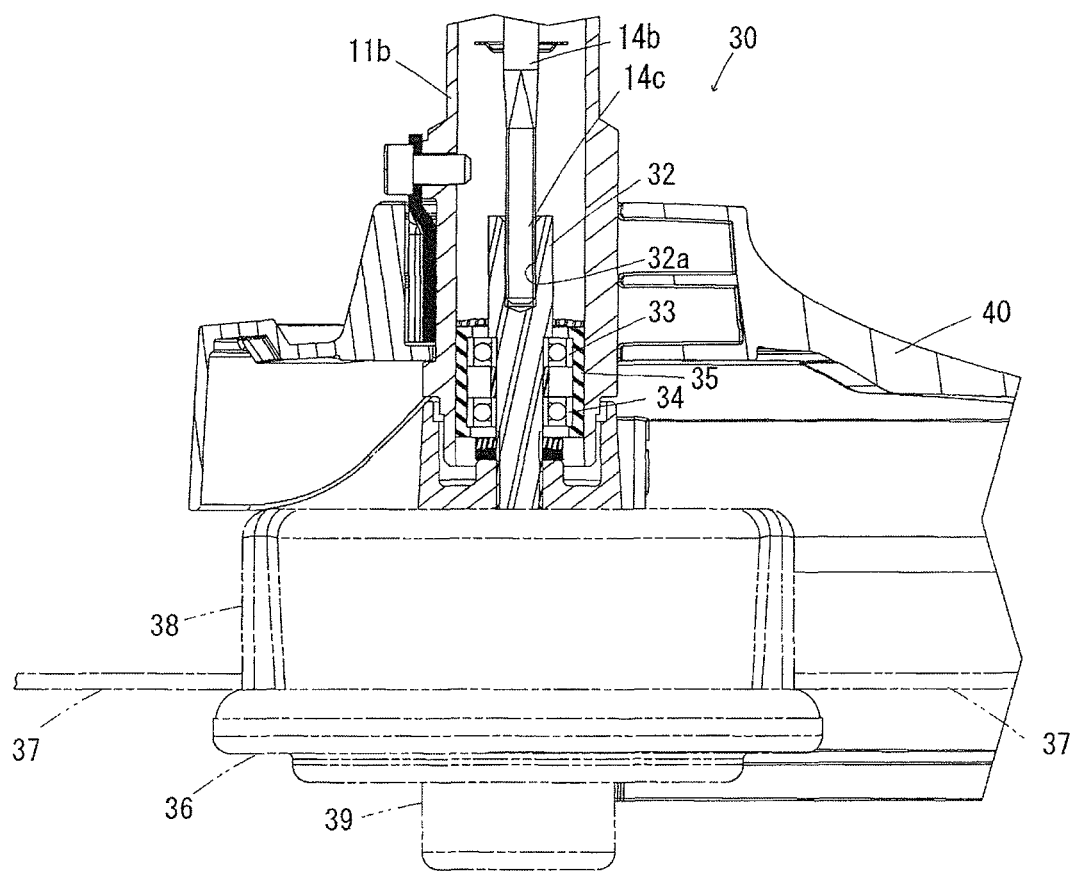
FIG. 8 is an enlarged cross-sectional view of a tool head in a second embodiment of a work apparatus according to the present invention.

FIG. 8 illustrates an enlarged cross-sectional view of a tool head 30 in a second embodiment of the vegetation cutter 10 according to the present invention. The feature of the second embodiment resides in that the tool shaft 32 of the rotary cutter 36 is supported by a pair of upper and lower ball bearings 33, 34 which in turn are supported by means of a flexible elastic member 35 on the internal circumferential wall of the distal end part of the frame tube 11 surrounding the bearings 33, 34, in place of the internal circumferential wall of the tool frame 31. This structure achieves the same effect as the above-described first embodiment. The modified embodiments of the flexible elastic member 35 in the above-described first embodiment of the vegetation cutter 10 can be employed also in this second embodiment of the vegetation cutter 10.

Figure 9:
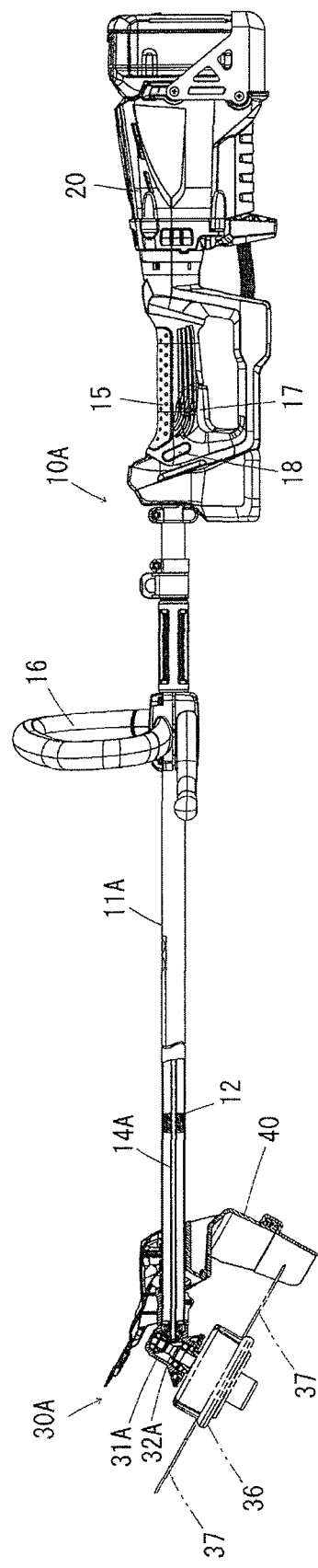
FIG. 9 is a longitudinal cross-sectional view of a third embodiment of a work apparatus according to the present invention.
Figure 10:
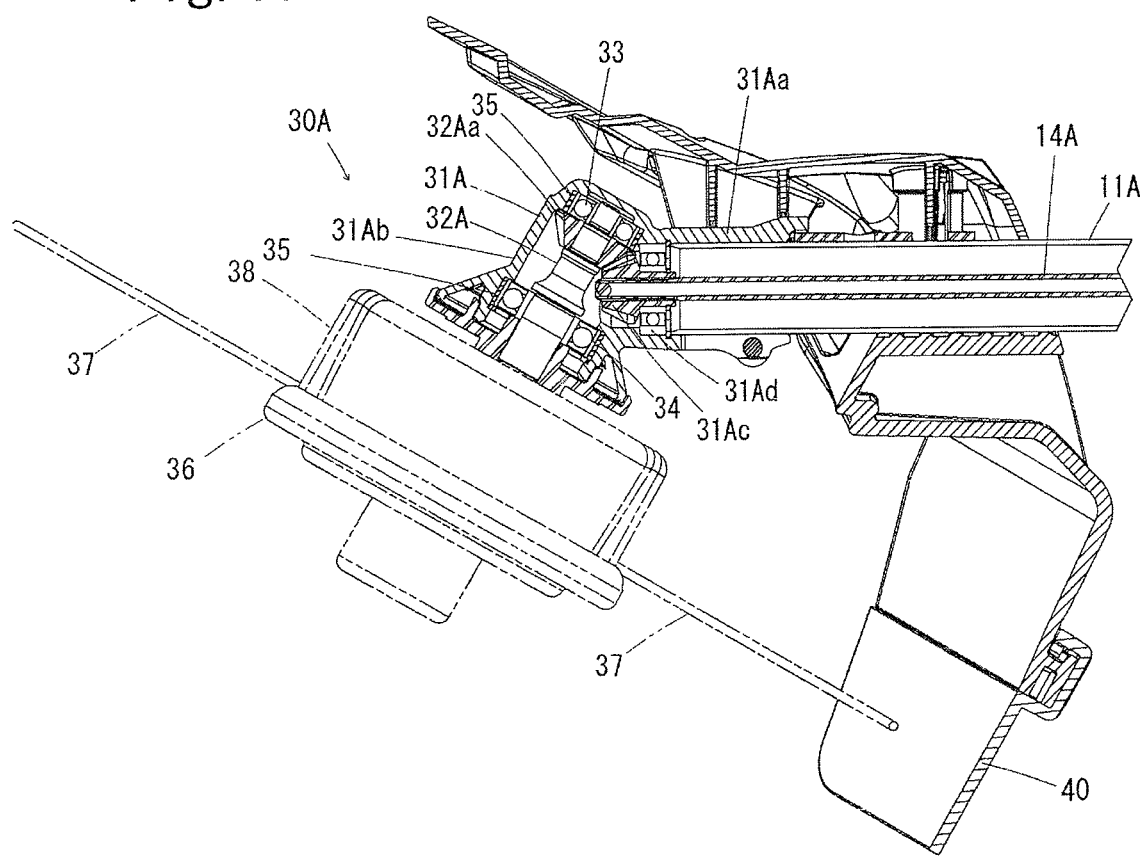
FIG. 10 is an enlarged cross-sectional view of a tool head in the work apparatus of FIG. 9.

FIGS. 9 and 10 illustrate a third embodiment of the vegetation cutter 10A according to the present invention. The feature of the third embodiment resides in that the frame tube 11A of a hollow pole is made straight through the entire length thereof, through which a straight drive shaft 14A is inserted and a tool head 30A is connected to the distal end of the straight frame tube 11A.

The tool head 30A comprises, as illustrated in FIG. 10, a tool frame 31A detachably fixed to the distal end of the tube frame 11A, a tool shaft 32A rotatably supported in the tool frame 31A and a rotary cutter 36 fixed to the tool shaft 32A.

The tool frame 31A includes a frame tube receiving portion 31Aa in a tubular shape which is to be connected to the distal end of the frame tube 11A and a tool shaft supporting portion 31Ab which rotatably support the tool shaft 32A, the two portions 31Aa and 31Ab are combined together at an angle.

The distal end of the frame tube 11A is inserted into the frame tube receiving portion 31Aa and the tool frame 31A is fixed to the distal end of the frame tube 11A using a fastening bolt. The inner circumferential wall of the frame tube receiving portion 31Aa rotatably supports a smaller bevel gear 31Ac via a ball bearing 31Ad, at the bottom of the frame tube receiving portion 31Aa facing the tool shaft supporting portion 31Ab. The smaller bevel gear 31Ac is in splined engagement with the tip of the drive shaft 14A. The rotary cutter 36 is arranged to rotate on the tool shaft 34A shaft 32A.

The tool shaft supporting portion 31Ab rotatably supports the tool shaft 32A via a pair of upper and lower ball bearings 33, 34. The tool shaft 32A is spline fixed to a larger bevel gear 32Aa under the upper ball bearing 33, which larger bevel gear 32Aa engages the smaller bevel gear 31Ac. In this embodiment, a tubular flexible elastic members 35, 35 are interposed between the internal circumferential wall of the tool shaft supporting portion 31Ab of the tool frame 31A and the pair of upper and lower ball bearings 33, 34 which support the tool shaft 32A, surrounding the ball bearings 33, 34.

The flexible elastic member 35 is made of rubber having a proper elastic modulus and functions to lower the natural vibration frequency of the vibratory system consisting of the tool frame 31A and frame tube 11a connection, the rotary cutter 36 assembly including the tool shaft 32A and the bearings 33, 34 (i.e. the tool head 30A excluding the tool frame 31A), and the flexible elastic member 35 coupling the connection and the assembly below the rotational frequency of the rotary cutter 36, thereby reducing the vibrations to be transmitted to the frame tube 11A.

When the operator uses the vegetation cutter 10A as configured as above, the operator holds the grip handle 15 with his/her right hand and the ring handle 16 with his/her left hand to keep the rotary cutter 36 above the ground by a small distance. The operator then pushes the safety lock release button 18 and, keeping pushing it, pushes the power switch 17. The electric motor 20 rotates the drive shaft 14A which in turn rotates the smaller bevel gear 31Aa, which in turn rotates the larger bevel gear 32Aa, which in turn rotates the tool shaft 32A, which finally rotates the rotary cutter 36.

As the operator swings the frame tube 11A to right and left to move the rotating rotary cutter 36 to right and left, the grasses or the lawns standing on the ground are cut off by the two nylon filaments 37 of the rotating rotary cutter 36. With the vegetation cutter 10A of the third embodiment, the flexible elastic members 35, 35 are effective in reducing the vibrations of the tool head 30A when the rotary cutter 36 rotates, which in turn reduces the vibrations of the frame tube 11A to the distal end of which the tool head 30A is fixed.

Also in this third embodiment of the vegetation cutter 10A, those various modified types of flexible elastic members as employed in the first embodiment of the vegetation cutter 10 can be employed as well.

While the above description has been made about the embodiments of vegetation cutters, the present invention can also be embodied in a brush cutter and a lawn trimmer employing a rotary cutter as the rotary tool of the tool head and in a polisher, a sander and a grinder employing a corresponding rotary device as the rotary tool of the tool head.

What is claimed is:

1. A work apparatus comprising:
a drive motor;
a tool head including a tool frame, a bearing, a tool shaft and a rotary tool, the rotary tool being fixed to the tool shaft and being rotatable on the tool shaft at a rotation frequency, the tool shaft being supported by the bearing within the tool frame;
a frame tube having a proximal end connected to the drive motor and a distal end connected to the tool frame of the tool head;
a drive shaft rotatably inserted through the frame tube and connecting the drive motor to the tool shaft to rotatably drive the rotary tool;
a proximal end of the tool shaft is connected to and extends coaxially with a distal end of the drive shaft
a flexible elastic member coaxially disposed surrounding the bearing for elastically supporting the bearing on the connection of the tool frame and the frame tube, and
wherein the tool head and the frame tube are connected together to define a vibratory system which has a natural frequency of vibration that is lower than the rotation frequency of the rotary tool.

2. A work apparatus as claimed in claim 1, wherein the frame tube has a straight portion toward the proximal end connected to the drive motor, and a bent portion toward the distal end connected to the tool frame of the tool head.

3. A work apparatus as claimed in claim 2, wherein the rotary tool is a rotary cutter comprised of a cutting line rotatably driven on the tool shaft.

4. A work apparatus as claimed in claim 3, wherein the flexible elastic member is a tubular member made of rubber enclosing the bearing which journals the tool shaft on which the rotary tool is rotatable.

5. A work apparatus as claimed in claim 2, wherein the rotary tool is a rotary cutter comprised of a cutting blade in a disk shape rotatably driven on the tool shaft.

6. A work apparatus as claimed in claim 5, wherein the flexible elastic member is a tubular member made of rubber enclosing the bearing which journals the tool shaft on which the rotary tool is rotatable.

7. A work apparatus as claimed in claim 2, wherein the flexible elastic member is a tubular member made of rubber enclosing the bearing which journals the tool shaft on which the rotary tool is rotatable.

8. A work apparatus as claimed in claim 1, wherein the rotary tool is a rotary cutter comprised of a cutting line rotatably driven on the tool shaft.

9. A work apparatus as claimed in claim 8, wherein the flexible elastic member is a tubular member made of rubber enclosing the bearing which journals the tool shaft on which the rotary tool is rotatable.

10. A work apparatus as claimed in claim 1, wherein the rotary tool is a rotary cutter comprised of a cutting blade in a disk shape rotatably driven on the tool shaft.

11. A work apparatus as claimed in claim 10, wherein the flexible elastic member is a tubular member made of rubber enclosing the bearing which journals the tool shaft on which the rotary tool is rotatable.

12. A work apparatus as claimed in claim 1, wherein the flexible elastic member is a tubular member made of rubber enclosing the bearing which journals the tool shaft on which the rotary tool is rotatable.

13. A work apparatus as claimed in claim 1, wherein ends of the flexible elastic member protrude radially inward so as to abut end faces of the bearing.

\* \* \* \* \*